Patented Nov. 5, 1946

2,410,445

UNITED STATES PATENT OFFICE 2,410,445

PRODUCTION OF DIOLEFINIC HYDROCARBONS BY REACTION OF AN ALCOHOL WITH AN ACETYLENIC HYDROCARBON

Vladimir N. Ipatieff and Herman Pines, Riverside, Ill., assignors to Universal Oil Products Company, Chicago, Ill., a corporation of Delaware No Drawing. Application November 25, 1942, Serial No. 466,923

10 Claims. (Cl. 260—681)

This invention relates to a process for producing butadiene and other diolefinic hydrocarbons from materials which are more readily available. More specifically, it is concerned with a process for producing butadiene in a single stage process in the presence of a solid catalyst.

One of the most important sources of synthetic rubber is butadiene, a hydrocarbon which is found in relatively small quantities in refinery gases and in hydrocarbon gases resulting from various other processes. Accordingly, processes which can produce butadiene in high yields from relatively common and cheap starting materials are highly meritorious and particularly at the present time.

We have found that butadiene and other diolefins, also called alkadienes, may be produced readily from alcohols and acetylenic hydrocarbons by a relatively simple catalytic process which not only results in the formation of high yields of diolefin but also in the production of other products, particularly olefins which may be separated from diolefins by fractionation methods. For example, we have found by experimentation that it is possible to react ethyl alcohol with acetylene in the presence of a catalyst to form substantial yields of butadiene and butenes.

In one specific embodiment, the present invention relates to a process for preparing diolefins which comprises reacting an alcohol and an acetylenic hydrocarbon in the presence of a catalyst having both dehydrating and dehydrogenating activities.

According to the process of the present invention, an alcohol and an acetylenic hydrocarbon are reacted at a temperature of from about 200° to about 600° C., under a pressure of less than about 20 atmospheres in the presence of a catalyst having both dehydrating and dehydrogenating activities. Alcohols and particularly alkanols which may be so utilized include ethyl alcohol, also known as ethanol, and its homologs of higher molecular weight. Acetylenic hydrocarbons also referred to as alkynes and utilizable as herein set forth comprise acetylene itself and higher boiling monoalkyl and dialkyl acetylenes.

Catalysts suitable for use in the present process include alumina, thoria, magnesia, silica, etc., either alone or in combination with one another, these catalysts having both dehydrating and dehydrogenating properties. If desired their dehydrogenating properties may be improved by the addition of small proportions of dehydrogenating catalysts such as cadmium, zinc, cobalt, etc. In some instances, it may be desirable to add hydrogen from an outside source in order to satisfactorily control the reaction and to prevent excessive polymerization of diolefinic hydrocarbons and other unsaturated products formed by the process.

While the process of this invention may be effected in batch type operation, it is preferable to utilize a continuous process for reacting alcohols with acetylenes to produce relatively high yields of diolefinic hydrocarbons.

Thus, ethyl alcohol and many higher alcohols may be reacted with acetylene itself or with other acetylenic hydrocarbons to produce butadiene and other diolefinic hydrocarbons of higher molecular weight than butadiene as well as certain amounts of mono-olefinic hydrocarbons which probably result from hydrogenation of diolefins, the hydrogen being derived from dehydrogenation of ethyl alcohol to acetaldehyde. However, reactions involving different alcohols and different acetylenic hydrocarbons are not necessarily carried out under the same conditions of operation to produce good yields of diolefinic hydrocarbon.

The following specific example is given to illustrate the process of the invention, although these data are introduced with no intention of unduly limiting its generally broad scope.

Acetylene at a rate of 10 liters of gas per hour and ethyl alcohol at a rate of 40 cc. of liquid per hour were passed under atmospheric pressure during a period of two hours over 50 cc. of Activated Alumina in the form of 3 x 3 mm. pellets contained in a Pyrex glass tube maintained at a temperature of 475° C. The reaction products were conducted through a receiver cooled to −78° C. to a gas holder in which uncondensed gases were collected for analysis and measured. Condensible gases which were collected as a liquid in the receiver at −78° C. had a gaseous volume of 5625 cc. under standard conditions and contained 19.3 mole per cent of acetylene, 22.4% of 1,3-butadiene and 24.3% butenes, the remainder of the gases consisting mainly of ethylene and propylene. The non-condensible gases which amounted to about 28 liters contained 26.5 mole per cent of acetylene, 48.1% of ethylene, 36.2% of hydrogen, and 7.4% of propylene and higher olefins.

The value of the present process is evident from consideration of the preceding specification and example presented, although neither section should be construed as imposing undue limitations upon the broad scope of the invention.

We claim as our invention:

1. A process for producing a diolefin which comprises reacting an alkanol and an alkyne at a temperature of from about 200° to about 600° C., under a pressure of less than about 20 atmospheres in the presence of a metal oxide catalyst having both dehydrating and dehydrogenating activities and consisting of at least one oxide selected from the group consisting of alumina, thoria, magnesia and silica.

2. A process for producing 1,3-butadiene which comprises reacting ethanol and acetylene at a temperature of from about 200° to about 600° C., under a pressure of less than about 20 atmospheres in the presence of a metal oxide catalyst having both dehydrating and dehydrogenating activities and consisting of at least one oxide selected from the group consisting of alumina, thoria, magnesia and silica.

3. A process for producing a diolefin which comprises reacting an alkanol and an alkyne at a temperature of from about 200° to about 600° C. in the presence of alumina.

4. A process for producing 1,3-butadiene which comprises reacting ethanol and acetylene at a temperature of from about 200° to about 600° C., in the presence of alumina.

5. A process for producing 1,3-butadiene which comprises reacting ethanol and acetylene in the presence of alumina at a temperature of from about 200° to about 600° C., and under a pressure of less than about 20 atmospheres.

6. A process for producing 1,3-butadiene which comprises reacting ethanol and acetylene at a temperature of from about 200° to about 600° C., in the presence of magnesia.

7. A process for producing 1,3-butadiene which comprises reacting ethanol and acetylene in the presence of magnesia at a temperature of from about 200° to about 600° C., and under a pressure of less than about 20 atmospheres.

8. A process for producing a diolefin which comprises reacting an alcohol and an acetylenic hydrocarbon at a temperature of from about 200° C. to about 600° C. in the presence of a dehydrating and dehydrogenating catalyst consisting of at least one oxide selected from the group consisting of alumina, thoria, magnesia and silica.

9. A process for producing a diolefin which comprises reacting an alkanol and an alkyne at a temperature of from about 200° to about 600° C., in the presence of a dehydrating and dehydrogenating catalyst consisting of at least one oxide selected from the group consisting of alumina, thoria, magnesia and silica.

10. A process for producing 1,3-butadiene which comprises reacting ethanol and acetylene at a temperature of from about 200° to about 600° C., in the presence of a dehydrating and dehydrogenating catalyst consisting of at least one oxide selected from the group consisting of alumina, thoria, magnesia and silica.

VLADIMIR N. IPATIEFF.
HERMAN PINES.